(12) United States Patent
Wang

(10) Patent No.: US 12,155,588 B2
(45) Date of Patent: Nov. 26, 2024

(54) METHOD AND DEVICE FOR TRANSMITTING SMALL DATA

(71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 514 days.

(21) Appl. No.: 17/544,258

(22) Filed: Dec. 7, 2021

(65) Prior Publication Data

US 2022/0094495 A1 Mar. 24, 2022

Related U.S. Application Data

(63) Continuation of application No. PCT/CN2019/094560, filed on Jul. 3, 2019.

(51) Int. Cl.
*H04L 5/00* (2006.01)
*H04W 72/21* (2023.01)
*H04W 76/15* (2018.01)

(52) U.S. Cl.
CPC .......... *H04L 5/0046* (2013.01); *H04L 5/0064* (2013.01); *H04W 72/21* (2023.01); *H04W 76/15* (2018.02)

(58) Field of Classification Search
CPC ...... H04L 5/0046; H04W 72/21; H04W 76/15
See application file for complete search history.

(56) References Cited

U.S. PATENT DOCUMENTS

| 2011/0222475 | A1* | 9/2011 | Hole | H04W 72/543 370/328 |
| 2019/0104553 | A1 | 4/2019 | Johansson et al. | |
| 2020/0053799 | A1* | 2/2020 | Jeon | H04L 5/0048 |

FOREIGN PATENT DOCUMENTS

| CN | 103119997 A | 5/2013 |
| CN | 107432040 A | 12/2017 |

(Continued)

OTHER PUBLICATIONS

International Search Report and Written Opinion dated Mar. 27, 2020 in International Application No. PCT/CN2019/094560. English translation attached.

*Primary Examiner* — Basil Ma
(74) *Attorney, Agent, or Firm* — Sheppard, Mullin, Richter & Hampton LLP

(57) ABSTRACT

Provided are a method and a device for transmitting small data, capable of improving a success rate of a terminal device in transmitting the small data, which is advantageous in saving power of the terminal device. The method includes: determining, by a terminal device, a target uplink carrier from a Supplementary Uplink (SUL) carrier and a Normal Uplink (NUL) carrier based on first information, the first information including at least one of: channel quality of a serving cell, a size of data to be transmitted, a Transport Block Size (TBS) supported by the SUL carrier and a TBS supported by the NUL carrier, a load balancing factor of the SUL carrier and a load balancing factor of the NUL carrier, and an uplink carrier indicated by a network device for transmitting the small data; and transmitting, by the terminal device, the small data on the target uplink carrier.

12 Claims, 4 Drawing Sheets

(56) References Cited

FOREIGN PATENT DOCUMENTS

| | | |
|---|---|---|
| CN | 107637128 A | 1/2018 |
| WO | 2018127502 A1 | 7/2018 |
| WO | 2019099087 A1 | 5/2019 |

* cited by examiner

METHOD AND DEVICE FOR TRANSMITTING SMALL DATA

CROSS-REFERENCE TO RELATED APPLICATION

The present application is a continuation of International Application No. PCT/CN2019/094560, filed on Jul. 3, 2019, the entire contents of which are incorporated herein by reference.

TECHNICAL FIELD

The present disclosure relates to communication technology, and more particularly, to a method and a device for transmitting small data.

BACKGROUND

With the development of technology, Early Data Transmission (EDT), also known as small data transmission, has been introduced. In this process, a terminal device can always remain in an idle state or an inactive state for transmission of uplink and/or downlink small data packets.

At present, when a terminal device transmits small data, there is still no clear solution regarding how to select an uplink carrier for small data transmission.

SUMMARY

The present disclosure provides a method and a device for transmitting small data, capable of improving a success rate of a terminal device in transmitting the small data, which is advantageous in saving power of the terminal device.

In a first aspect, a method for transmitting small data is provided. The method includes: determining, by a terminal device, a target uplink carrier from a Supplementary Uplink (SUL) carrier and a Normal Uplink (NUL) carrier based on first information, the first information including at least one of: channel quality of a serving cell, a size of data to be transmitted, a Transport Block Size (TBS) supported by the SUL carrier and a TBS supported by the NUL carrier, a load balancing factor of the SUL carrier and a load balancing factor of the NUL carrier, and an uplink carrier indicated by a network device for transmitting the small data; and transmitting, by the terminal device, the small data on the target uplink carrier.

In a second aspect, a method for transmitting small data is provided. The method includes: transmitting, by a network device, indication information to a terminal device, the indication information including at least one of: at least one threshold of a channel quality of a serving cell, a Transport Block Size (TBS) supported by a Supplementary Uplink (SUL) carrier and a TBS supported by a Normal Uplink (NUL) carrier, a load balancing factor of the SUL carrier and a load balancing factor of the NUL carrier, and an uplink carrier indicated for transmitting the small data, the indication information being used for the terminal device to select a target uplink carrier from the SUL carrier and the NUL carrier for transmitting the small data.

In a third aspect, a terminal device is provided. The terminal device is configured to perform the method according to the above first aspect or any implementation thereof.

In particular, the terminal device includes one or more functional modules for performing the method according to the above first aspect or any implementation thereof.

In a fourth aspect, a network device is provided. The network device is configured to perform the method according to the above second aspect or any implementation thereof.

In particular, the network device includes one or more functional modules for performing the method according to the above second aspect or any implementation thereof.

In a fifth aspect, a terminal device is provided. The terminal device includes a processor and a memory. The memory is configured to store a computer program, and the processor is configured to invoke and execute the computer program stored in the memory to perform the method according to the above first aspect or any implementation thereof.

In a sixth aspect, a network device is provided. The network device includes a processor and a memory. The memory is configured to store a computer program, and the processor is configured to invoke and execute the computer program stored in the memory to perform the method according to the above second aspect or any implementation thereof.

In a seventh aspect, an apparatus is provided. The apparatus is configured to perform the method according to the above first and second aspects or any implementation thereof.

In particular, the apparatus includes a processor configured to invoke and execute a computer program from a memory, to cause a device provided with the apparatus to perform the method according to the above first and second aspects or any implementation thereof.

In an eighth aspect, a computer-readable storage medium is provided. The computer-readable storage medium is configured to store a computer program that causes a computer to perform the method according to the above first and second aspects or any implementation thereof.

In a ninth aspect, a computer program product is provided. The computer program product includes computer program instructions that cause a computer to perform the method according to the above first and second aspects or any implementation thereof.

In a tenth aspect, a computer program is provided. The computer program, when executed on a computer, causes the computer to perform the method according to the above first and second aspects or any implementation thereof.

With the solutions according to the present disclosure, a terminal device can select a target carrier for transmitting small data from a SUL carrier and a NUL carrier based on first information. In this way, a success rate of the terminal device in transmitting the small data can be improved, which is advantageous in saving power of the terminal device.

DESCRIPTION OF EMBODIMENTS

Figure 1:
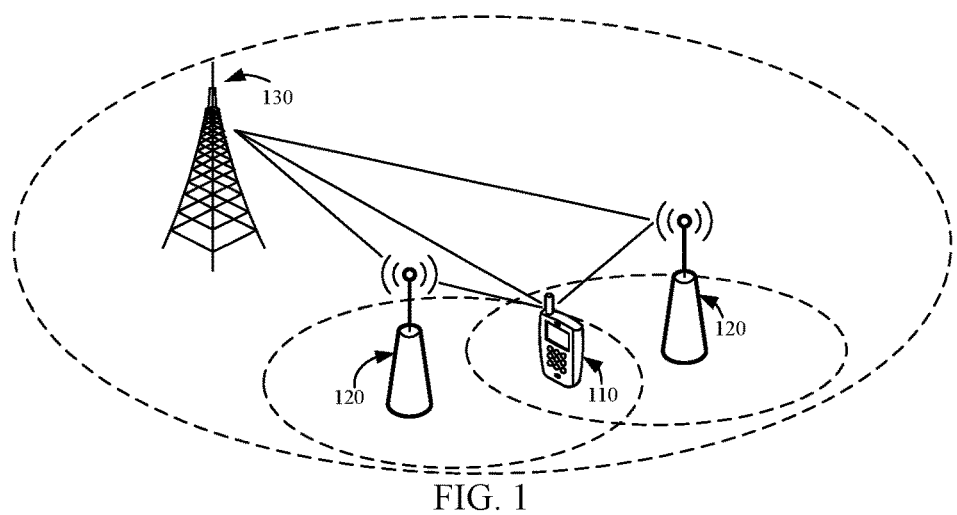
FIG. 1 is a schematic diagram illustrating a wireless communication system in which an embodiment of the present disclosure can be applied.

In an aspect of the present disclosure, a method for transmitting small data is provided. The method includes: determining, by a terminal device, a target uplink carrier from a Supplementary Uplink (SUL) carrier and a Normal Uplink (NUL) carrier based on first information, the first information including at least one of: channel quality of a serving cell, a size of data to be transmitted, a Transport Block Size (TBS) supported by the SUL carrier and a TBS supported by the NUL carrier, a load balancing factor of the SUL carrier and a load balancing factor of the NUL carrier, and an uplink carrier indicated by a network device for transmitting the small data; and transmitting, by the terminal device, the small data on the target uplink carrier.

In an embodiment, the first information includes the load balancing factor of the SUL carrier and the load balancing factor of the NUL carrier, and said determining, by the terminal device, the target uplink carrier based on the first information includes: determining, by the terminal device, at least one candidate uplink carrier based on at least one of the channel quality of the serving cell, the TBS supported by the SUL carrier, and the TBS supported by the NUL carrier; and selecting, by the terminal device when the at least one candidate uplink carrier includes the NUL carrier and the SUL carrier, one of the SUL carrier and the NUL carrier as the target uplink carrier based on the load balancing factor of the SUL carrier and the load balancing factor of the NUL carrier.

In an embodiment, the target uplink carrier includes the SUL carrier when the size of data to be transmitted is smaller than or equal to the TBS supported by the SUL carrier, or the target uplink carrier includes the NUL carrier when the size of the data to be transmitted is smaller than or equal to the TBS supported by the NUL carrier.

In another aspect of the present disclosure, a method for transmitting small data is provided. The method includes: transmitting, by a network device, indication information to a terminal device, the indication information including at least one of: at least one threshold of a channel quality of a serving cell, a Transport Block Size (TBS) supported by a Supplementary Uplink (SUL) carrier and a TBS supported by a Normal Uplink (NUL) carrier, a load balancing factor of the SUL carrier and a load balancing factor of the NUL carrier, and an uplink carrier indicated for transmitting the small data, the indication information being used for the terminal device to select a target uplink carrier from the SUL carrier and the NUL carrier for transmitting the small data.

In an embodiment, the channel quality of the serving cell is represented by at least one of: Reference Signal Received Power (RSRP), Reference Signal Received Quality (RSRQ), Received Signal Strength Indication (RSSI), and Signal to Interference plus Noise Ratio (SINR).

In an embodiment, the uplink carrier for transmitting the small data is indicated by the network device to the terminal device using at least one of a Radio Resource Control (RRC) release message and a small data transmission complete message.

In an embodiment, the TBS supported by the SUL carrier indicates that the terminal device is to select the SUL carrier as the target uplink carrier when a size of data to be transmitted is smaller than or equal to the TBS supported by the SUL carrier, and the TBS supported by the NUL carrier indicates that the terminal device is to select the NUL carrier as the target uplink carrier when a size of data to be transmitted is smaller than or equal to the TBS supported by the NUL carrier.

In an embodiment, the terminal device is in an idle state or an inactive state.

FIG. 1 is a schematic diagram illustrating a system 100 according to an embodiment of the present disclosure.

As illustrated in FIG. 1, a terminal device 110 is connected to a first network device 130 in a first communication system and a second network device 120 in a second communication system. For example, the first network device 130 may be a network device in Long Term Evolution (LTE), and the second network device 120 may be a network device in New Radio (NR).

Here, each of the first network device 130 and the second network device 120 may include a plurality of cells.

It can be appreciated that FIG. 1 is an example of a communication system according to an embodiment of the present disclosure, and the embodiment of the present disclosure is not limited to what is illustrated in FIG. 1.

As an example, the communication system to which the embodiment of the present disclosure is applicable may include at least a plurality of network devices in the first communication system and/or a plurality of network devices in the second communication system.

For example, the system 100 illustrated in FIG. 1 may include one primary network device in the first communication system and at least one secondary network device in the second communication system. Each of the at least one secondary network device is connected to the one primary network device to form a plurality of connections, and is connected to the terminal device 110 to provide services for the terminal device 110. In particular, the terminal device 110 may simultaneously establish connections via the primary network device and the secondary network device.

Optionally, the connection established between the terminal device 110 and the primary network device is a primary connection, and the connection established between the terminal device 110 and the secondary network device is a secondary connection. Control signaling for the terminal device 110 may be transmitted via the primary connection, and data for the terminal device 110 may be transmitted via both the primary connection and the secondary connection, or may be transmitted via the secondary connection only.

As another example, the first communication system and the second communication system in the embodiment of the present disclosure may be different, but the embodiment of the present disclosure is not limited to any specific types of the first communication system and the second communication system.

For example, the first communication system and the second communication system may be any of various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, LTE Time Division Duplex (TDD) system, or Universal Mobile Telecommunication System (UMTS).

Each of the primary network device and the secondary network device may be any access network device.

Optionally, in some embodiments, the access network device may be a base station such as Base Transceiver Station (BTS) in a GSM system or a CDMA system, a base station such as NodeB (NB) in a WCDMA system, or a base station such as Evolutional Node B (eNB or eNodeB) in an LTE system.

Alternatively, the access network device may be a base station such as a gNB in a Next Generation Radio Access Network (NG RAN) or NR system, or a radio controller in a Cloud Radio Access Network (CRAN). Alternatively, the access network device may be a relay station, an access point, a vehicle-mounted device, a wearable device, or a network device in a future evolved Public Land Mobile Network (PLMN).

In the system 100 illustrated in FIG. 1, as an example, the first network device 130 may be the primary network device, and the second network device 120 may be the secondary network device.

The first network device 130 may be an LTE network device, and the second network device 120 may be an NR network device. Alternatively, the first network device 130 may be an NR network device, and the second network device 120 may be an LTE network device. Alternatively, both the first network device 130 and the second network device 120 may be NR network devices. Alternatively, the first network device 130 may be a GSM network device, a CDMA network device, or the like, and the second network device 120 may also be a GSM network device, a CDMA network device, or the like. Alternatively, the first network device 130 may be a macrocell base station, and the second network device 120 may be a microcell base station, a picocell base station, a femtocell base station, or the like.

Optionally, the terminal device 110 may be any terminal device. The terminal device 110 may include, but not limited to, an apparatus connected via a wired line, e.g., via a Public Switched Telephone Network (PSTN), a Digital Subscriber Line (DSL), a digital cable, or a direct cable connection, and/or via another data connection/network, and/or via a wireless interface, e.g., for a cellular network, a Wireless Local Area Network (WLAN), a digital TV network such as a DVB-H network, a satellite network, an AM-FM broadcast transmitter, and/or another terminal device, and configured to receive/transmit communication signals, and/or an Internet of Things (IoT) device. A terminal device configured to communicate via a wireless interface may be referred to as a "wireless communication terminal", a "wireless terminal", or a "mobile terminal". Examples of the mobile terminal may include, but not limited to, a satellite or cellular phone, a Personal Communications System (PCS) terminal combining cellular radio phone with data processing, fax, and data communication capabilities, a PDA including a radio phone, a pager, Internet/intranet access, a Web browser, a memo pad, a calendar, and/or a Global Positioning System (GPS) receiver, or a conventional laptop and/or palmtop receiver or another electronic device including a radio telephone transceiver. The terminal device may be an access terminal, a User Equipment (UE), a user unit, a user station, a mobile station, a mobile device, a remote station, a remote terminal, a mobile device, a user terminal, a terminal, a wireless communication device, a user agent, or a user. Device. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a 5G network, or a terminal devices in a future evolved PLMN, etc.

It is to be noted that the terms "system" and "network" are often used interchangeably herein.

Currently, with people's pursuit of speed, delay, high-speed mobility, and energy efficiency, and the diversity and complexity of services in the future, the 3GPP International Standard Organization has begun to develop the 5G. The main application scenarios of the 5G include: enhanced Mobile Broad Band (eMBB), Ultra Reliable and Low Latency Communication (URLLC), and massive Machine Type Communication (mMTC).

The eMBB still aims at providing users with multimedia content, services and data, and the demands for the eMBB are growing very rapidly. On the other hand, as the eMBB may be deployed in different scenarios, such as indoors, urban areas, rural areas, etc., with quite different capabilities and requirements are, it could be very different and should be analyzed in detail in conjunction with specific deployment scenarios. Typical applications of the URLLC include: industrial automation, power automation, telemedicine operations (surgeries), transportation safety protection, etc. Typical features of mMTC include: high connection density, small data volume, delay-insensitive services, and low cost and long service lives of modules.

In the early deployment of NR, it is difficult to provide full NR coverage, so the typical network coverage is wide-area LTE coverage and island-mode NR coverage. Moreover, the LTE is most deployed below 6 GHz, and there is very little spectrum below 6 GHz that can be used for the 5G. Therefore, the NR must study a spectrum application above 6 GHz, and the high frequency band has limited coverage and fast signal fading. At the same time, in order to protect early investments of mobile operators in the LTE, a tight interworking mode between the LTE and the NR has been proposed, in which the NR can also operate independently. In the 5G, the maximum channel bandwidth can be 400 MHz (wideband carrier), which is very large compared to the LTE's maximum bandwidth of 20M.

In the 5G, the uplink power of terminal devices is limited, and the frequency of the NR spectrum is relatively high. As the propagation loss becomes higher for higher frequency, the uplink coverage of the NR will be limited. In order to improve the uplink coverage, the LTE spectrum can be used as the uplink to improve the uplink coverage since the frequency of the LTE spectrum is relatively low.

Figure 2:
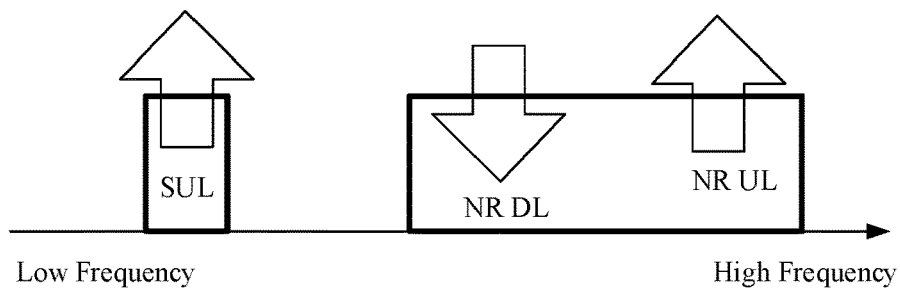
FIG. 2 is a schematic diagram illustrating an NR SUL spectrum according to an embodiment of the present disclosure.

As illustrated in FIG. 2, the NR spectrum includes NR downlink (DL) and NR uplink (UL). The NR uplink can also be referred to as Normal Uplink (NUL), and the supplementary LTE uplink spectrum is a Supplementary Uplink (SUL) spectrum. The UE can select to perform uplink transmission on the SUL carrier or on the NUL carrier.

The SUL, NUL, and DL may belong to the same cell. The terminal device can only operate on one uplink carrier at a time. The terminal device can select the uplink carrier as follows: if the NUL carrier can satisfy a transmission condition, the NUL carrier can be selected first for uplink transmission, or otherwise the SUL carrier can be selected for uplink transmission.

In particular, the terminal device can select the uplink carrier as follows.

1. The network device can dynamically indicate to the terminal device which carrier is to be used for transmitting an uplink signal via Downlink Control Information (DCI), and the terminal device can perform uplink transmission on the carrier indicated by the network device.

2. When the terminal device in an idle state initially accesses a network, the terminal device can select the uplink carrier by comparing Reference Signal Received Power (RSRP) of a downlink signal with a threshold value broadcasted by the network device. In particular, the network device can broadcast the RSRP threshold value in a system message. When the terminal device in the idle state wants to access the network, it can measure the RSRP of the downlink signal and compare the RSRP value of the downlink signal with the threshold value. If the measured RSRP value is smaller than the threshold value configured by the network device, the terminal device can select the SUL carrier as the uplink carrier. If the measured RSRP value is greater than or equal to the threshold value configured by the network device, the terminal device can select the NUL as the uplink carrier.

3. In a cell handover process and in a contention-free based random access procedure indicated by a Physical Downlink Control Channel (PDCCH), when configuring a dedicated random access resource to the terminal device, the network device can also configure which of the SUL carrier and the NUL carrier the dedicated random access resource is on. Based on this, the terminal device can perform random access on the random access resource on the carrier configured by the network device.

Figure 3:
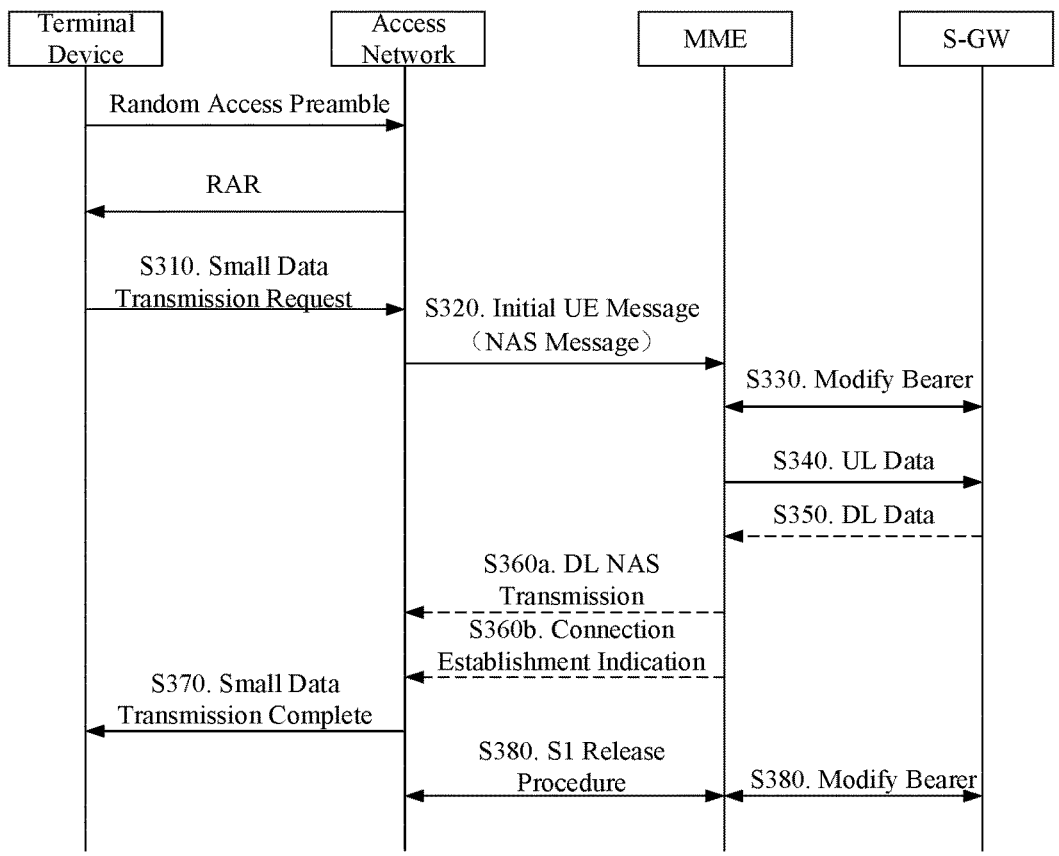
FIG. 3 is a schematic flowchart illustrating small data transmission in a control plane of a terminal device according to an embodiment of the present disclosure.
Figure 4:
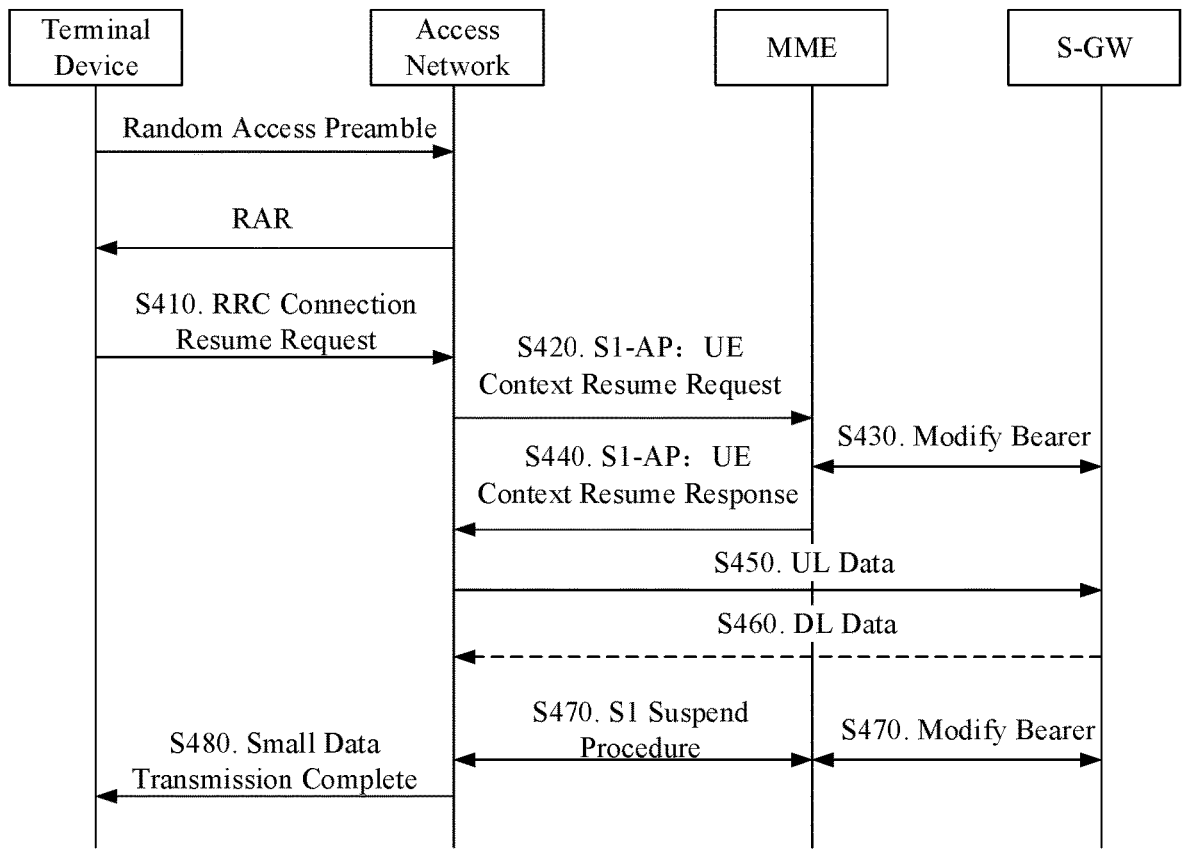
FIG. 4 is a schematic flowchart illustrating small data transmission in a user plane of a terminal device according to an embodiment of the present disclosure.

With the development of technology, small data transmission has been introduced. In this process, a terminal device can always remain in the idle state, suspend state, or inactive state to complete transmission of uplink and/or downlink small data packets, as illustrated in FIG. 3 and FIG. 4. FIG. 3 and FIG. 4 illustrate flowcharts of transmitting small data in a control plane and a user plane of the terminal device, respectively.

FIG. 3 illustrates a schematic flowchart of a method for transmitting small data in a control plane of a terminal device. The method includes steps S310 to S380.

At S310, the terminal device can transmit a Radio Resource Control (RRC) early data request (RRCEarlyDataRequest) to an access network. The RRCEarlyDataRequest may include a UE identifier, an establishment cause (establishmentCause), Non-Access Stratum (NAS) dedicated information, etc. The UE identifier may include, for example, a Short Temporary Mobile Subscription Identifier (S-TMSI).

The terminal device can encapsulate small data in a NAS message, which can be transmitted in a Common Control Channel (CCCH) via RRC dedicated signaling.

Optionally, before S310, the terminal device can also transmit a random access preamble to the access network. After receiving the random access preamble transmitted by the terminal device, the access network can transmit a Random Access Response (RAR) to the terminal device. The terminal device can perform the step S310 in response to the RAR transmitted by the network device.

At S320, the access network transmits an initial UE message, which may be a NAS message, to a Mobility Management Entity (MME).

At S330, a core network side modifies a bearer. In particular, the core network can modify the bearer between the MME and a serving gateway (S-GW).

At S340, the MME transmits uplink data to the S-GW.

At S350, the S-GW transmits downlink data to the MME.

At S360a, the MME transmits NAS to the access network.

At S360b, the MME transmits a CONNECTION ESTABLISHMENT INDICATION to the access network.

At S370, the access network transmits a small data complete message to the terminal device.

In particular, the small data complete message may be an RRC early transmission complete (RRCEarlyDataComplete) message.

The RRCEarlyDataComplete may include mobility control parameters for the UE, and the RRCEarlyDataComplete may be transmitted in a Common Control Channel (CCCH).

At S380, S1 releases a process between the access network and the MME, and modifies the bearer between the MME and the S-GW.

FIG. 4 illustrates a schematic flowchart of a method for transmitting small data in a user plane of a terminal device. In the method illustrated in FIG. 4, the small data is multiplexed in a transport block via a Dedicated Transmission Channel (DTCH) and RRC dedicated signaling (CCCH). The method includes steps S410 to S480.

At S410, the terminal device can transmit an RRC Connection Resume Request (RRCConnectionResumeRequest) message to an access network.

The RRCConnectionResumeRequest message may include a resume ID (resumeID), a resume cause (resumeCause), a short resume message authentication code integrity (MAC-I), and uplink data.

Optionally, before S410, the terminal device can also transmit a random access preamble to the access network. After receiving the random access preamble transmitted by the terminal device, the access network can transmit a Random Access Response (RAR) to the terminal device. The terminal device can perform the step S410 in response to the RAR transmitted by the network device.

At S420, the access network transmits a UE Context Resume Request to an MME.

The UE Context Resume Request may be transmitted using the S1 Application Protocol (S1-AP).

At S430, a core network side modifies a bearer. In particular, the core network can modify the bearer between the MME and an S-GW.

At S440, the MME transmits a UE Context Resume Response to the access network.

The UE Context Resume Response may also be transmitted using the S1-AP.

At S450, the access network transmits the uplink data to the S-GW.

If the S-GW has downlink data to be transmitted to the terminal device, the method may proceed with S460. If the S-GW has no downlink data to be transmitted to the terminal device, the method may proceed with S470.

At S460, the S-GW transmits the downlink data to the access network.

At S470, the core network side modifies the bearer. In particular, the core network can modify the bearer between the MME and the S-GW. In addition, an S1 Suspend Procedure between the MME and the access network can be performed.

At S480, the access network transmits an RRC connection release message to the terminal device. The connection release message may include at least one of: a release cause, a resume ID, a Next-hop Chaining Counter (NCC), and the downlink data.

The access network in the embodiments of the present disclosure refers to an access network device, which may refer to a base station.

As can be seen from FIGS. 3 and 4, the small data transmission occupies the MSG3 resource and uses the CCCH, and thus has uplink coverage that is limited compared to MSG3 transmission carrying no data. This is because the greater the amount of data transmitted is, the higher the modulation and coding level will be required for the transmission channel. If the terminal device selects the SUL carrier and the NUL carrier as described above, the terminal device may not be able to transmit data successfully on the selected uplink carrier as the MSG3 carries data. In accordance with the existing random access procedure, the terminal device will try small data access many times, thereby increasing power consumption of the terminal device, which is disadvantageous to energy saving of the MTC terminal for the small data transmission.

Figure 5:
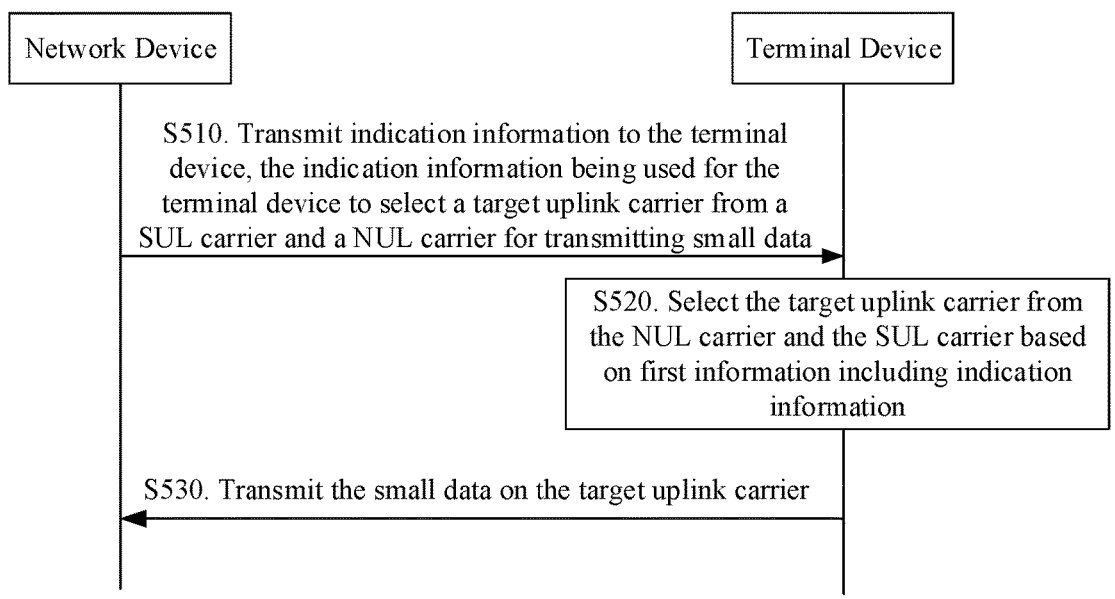
FIG. 5 is a schematic flowchart illustrating a method for transmitting small data according to an embodiment of the present disclosure.

An embodiment of the present disclosure provides a method for transmitting small data, capable of improving the success rate of small data transmission, which is advantageous in saving power of a terminal device. As illustrated in FIG. 5, the method includes steps S510 to S530.

At S510, a network device transmits indication information to a terminal device. The indication information is used for the terminal device to select a target uplink carrier from a SUL carrier and a NUL carrier for transmitting small data.

The indication information includes at least one of: at least one threshold of a channel quality of a serving cell, a Transport Block Size (TBS) supported by the SUL carrier and a TBS supported by the NUL carrier, a load balancing factor of the SUL carrier and a load balancing factor of the NUL carrier, and an uplink carrier indicated for transmitting the small data.

At S520, the terminal device selects the target uplink carrier from the NUL carrier and the SUL carrier based on first information.

The first information may include the content of the indication information transmitted by the network device, and the first information may further include a size of data to be transmitted and channel quality of the serving cell. For example, the first information may include at least one of: the channel quality of the serving cell, the size of data to be transmitted, the TBS supported by the SUL carrier and the TBS supported by the NUL carrier, the load balancing factor of the SUL carrier and the load balancing factor of the NUL carrier, and the uplink carrier indicated by the network device for transmitting the small data.

Of course, as an alternative to obtaining the content of the first information in accordance with the indication from the network device, the content of the first information can be obtained in other ways. For example, the at least one threshold of the channel quality of the serving cell may be preconfigured in the terminal device, or may be predefined in a protocol.

At S530, the terminal device transmits the small data on the target uplink carrier.

In the embodiment of the present disclosure, the serving cell in the channel quality of the serving cell may refer to a cell currently serving the terminal device.

The SUL carrier may be obtained by the terminal device from a system message, and each downlink carrier may correspond to a particular SUL carrier. Therefore, the terminal device may determine SUL carriers available for selection based on downlink carriers.

In some cases, some downlink carrier may not correspond to a SUL carrier, but may only correspond to one NUL carrier. In this case, the terminal device only transmits the small data on the NUL carrier.

In the embodiment of the present disclosure, the terminal device may be a terminal device in a non-connected state. For example, the terminal device may be in an idle state or an inactive state.

The small data transmission in the embodiment of the present disclosure may include at least one of: data transmission performed when the terminal device has not entered an RRC Connected state, data transmission performed by the terminal device via the message 3 (MSG3) in a four-step random access procedure, data transmission performed by the terminal device in the first message in a two-step random access procedure, and data transmission performed by the terminal device on a pre-configured (configured UL grant based) uplink resource.

The terminal device transmitting the small data on the target carrier may include the terminal device transmitting the small data on the target carrier in a first scheme, which includes at least one of: the third message (MSG3) in a four-step random access procedure, the first message (MSG A) in a two-step random access procedure, and a pre-configured uplink resource.

In the embodiment of the present disclosure, the two-step random access procedure may refer to a random access procedure in which the first message and the third message in the four-step random access procedure are combined into a MSG A, and the second message and the fourth message in the four-step random access procedure are combined into a MSG B.

The MSG A may include a random access preamble and a Physical Uplink Shared Channel (PUSCH), and the MSG B may include a Random Access Response (RAR) and a contention resolution message.

There are multiple schemes for the terminal device to select the target uplink carrier based on the first information, which will be described in detail below in conjunction with specific situations.

The target uplink carrier can be one of the NUL carrier and the SUL carrier that meets at least one of the following conditions: a corresponding channel quality range including the channel quality of the serving cell, and the supported TBS being greater than or equal to the size of the data to be transmitted, and the uplink carrier indicated by the network device for transmitting the small data.

As an example, the target uplink carrier may be one of the NUL carrier and the SUL carrier that has a corresponding channel quality range including the channel quality of the serving cell. The corresponding channel quality range including the channel quality of the serving cell may mean that the corresponding channel quality range includes a level of the channel quality of the serving cell as measured by the terminal device.

In an embodiment of the present disclosure, corresponding channel quality ranges can be defined for the SUL carrier and the UL carrier, respectively. The terminal device may use the carrier corresponding to the channel quality range within which the measured channel quality of the serving cell falls as the target uplink carrier.

The channel quality range corresponding to the SUL carrier may be a first range, and the channel quality range corresponding to the NUL carrier may be a second range. When determining the target uplink carrier, the terminal device may measure the channel quality of the serving cell, and compare the measured channel quality of the serving cell with the first range and the second range. If the measured channel quality of the serving cell falls within the first range, the terminal device can determine the SUL carrier as the target uplink carrier. If the measured channel quality of the serving cell falls within the second range, the terminal device can determine the NUL carrier as the target uplink carrier.

The channel quality of the serving cell may be represented by at least one of: Reference Signal Received Power (RSRP), Reference Signal Received Quality (RSRQ), Received Signal Strength Indication (RSSI), and Signal to Interference plus Noise Ratio (SINR).

The terminal device measuring the channel quality of the serving cell may mean that the terminal device measures at least one of the RSRP, RSRQ, RSSI, and SINR of a downlink signal.

The channel quality range of the serving cell can be represented by e.g., a threshold value.

For example, the at least one threshold of the channel quality of the serving cell may include a first threshold value. When the channel quality of the serving cell is higher than or equal to the first threshold value, the target carrier can be the NUL carrier, and the terminal device can transmit the small data on the NUL carrier. When the channel quality of the serving cell is lower than the first threshold value, the target carrier may be the SUL carrier, and the terminal device can transmit the small data on the SUL carrier.

The first threshold value may be a threshold value specifically set for small data transmission, which may be different from a conventional channel quality threshold value. The conventional channel quality threshold value may refer to a threshold based on which the terminal device selects the target uplink carrier based on the channel quality of the serving cell while performing a normal random access and then transmitting data in the connected state. For the purpose of illustration, the threshold is referred to as a conventional threshold value hereinafter.

In an embodiment of the present disclosure, the first threshold value may be greater than the conventional threshold value. Compared with the conventional threshold value, the condition for the terminal device to select the NUL carrier can be made more difficult to be met, so as to prevent the terminal device from selecting the NUL carrier but failing to transmit the small data on the NUL carrier, which would otherwise cause a waste of resources. This is advantageous to energy saving of the terminal device.

In another example, the at least one threshold of the channel quality of the serving cell may include a first threshold value and a second threshold value. The first threshold value may be the same as the first threshold value described above, and the second threshold value may be smaller than the first threshold value.

When the channel quality of the serving cell is higher than or equal to the first threshold, the target carrier can be the NUL carrier, and the terminal device can transmit the small data on the NUL carrier. When the channel quality of the serving cell is lower than the first threshold value and higher than or equal to the second threshold value, the target carrier can be the SUL carrier, and the terminal device can transmit the small data on the SUL carrier.

The second threshold value may be smaller than the conventional threshold value.

In an embodiment of the present disclosure, the second threshold value can be set for selection of the SUL carrier. That is, when the channel quality of the serving cell is relatively low, for example, when the channel quality of the serving cell is lower than the second threshold value, the terminal device will not select the SUL carrier for transmitting the small data, so as to prevent the terminal device from selecting the SUL carrier but failing to transmit the small data on the SUL carrier, which would otherwise cause a waste of resources. This is advantageous to energy saving of the terminal device.

In another example, the channel quality of the serving cell may include a first threshold value, a second threshold value, and a third threshold value. The first threshold value and the second threshold value may be the same as the first threshold value and the second threshold value as described above, respectively. The third threshold value may be greater than the second threshold value and smaller than the first threshold value. As an example, the third threshold value may be equal to the conventional threshold value.

Figure 6:
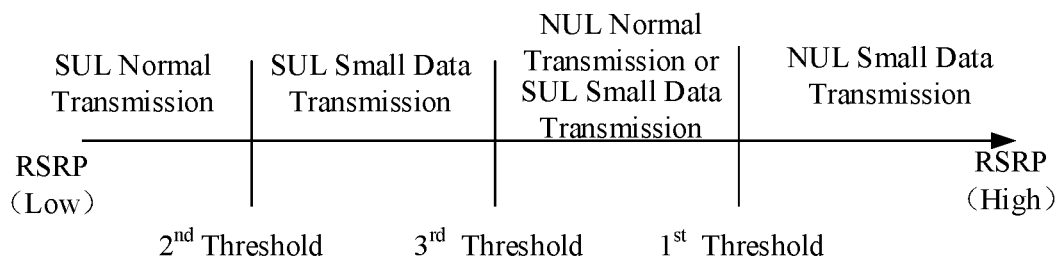
FIG. 6 is a schematic diagram illustrating a method for determining a target carrier based on RSRP according to an embodiment of the present disclosure.

Referring to FIG. 6, the third threshold value is between the first threshold value and the second threshold value. When the channel quality of the serving cell is higher than or equal to the first threshold value, the terminal device can select the NUL carrier for transmitting the small data. When the channel quality of the serving cell is lower than the first threshold value and higher than or equal to the second threshold value, the terminal device may have two options.

Option 1: When the channel quality of the serving cell is lower than the first threshold value and higher than or equal to the second threshold value, the terminal device can select the SUL carrier for transmitting the small data.

Option 2: When the channel quality of the serving cell is lower than the third threshold value and higher than or equal to the second threshold value, the terminal device can select the SUL carrier for transmitting the small data. When the channel quality of the serving cell is lower than the first threshold value and higher than or equal to the third threshold value, the terminal device can select the NUL carrier for normal transmission.

The normal transmission here means that the terminal device performs a normal random access procedure, and transmits data after the random access succeeds. The terminal device selecting the NUL carrier for normal transmission may mean that the terminal device selects the NUL carrier to transmit a connection establishment request message or a connection resume request message carrying no small data to the network device.

In addition, when the channel quality of the serving cell is lower than the second threshold value, the terminal device can select the SUL carrier for normal transmission. For example, the terminal device can select the SUL carrier to transmit a connection establishment request message or connection resume request message carrying no small data to the network device.

The threshold value(s) of the channel quality of the serving cell may be broadcasted by the network device to the terminal device via a system message.

The system message may include at least one threshold value for small data transmission, and may also include at least one threshold value for normal data transmission. It is assumed that the at least one threshold value for small data transmission includes the first threshold value, and the at least one threshold value for normal data transmission includes the third threshold value. When the NAS layer triggers the AS layer to transmit the small data, the terminal device selects the uplink carrier based on the first threshold value. That is, the terminal device can compare the channel quality of the current serving cell with the first threshold value. If the channel quality of the serving cell is higher than or equal to the first threshold value, the terminal device can select the NUL carrier for transmitting the small data. If the channel quality of the serving cell is lower than the first threshold value, the terminal device can select the SUL carrier for transmitting the small data. When the NAS layer triggers the AS layer to perform a normal connection establishment or a connection resume, the terminal device can select the uplink carrier based on the third threshold value. That is, the terminal device can compare the channel quality of the current serving cell with the third threshold value. If the channel quality of the serving cell is higher than or equal to the third threshold value, the terminal device can select the NUL carrier for data transmission. If the channel quality of the serving cell is lower than the third threshold value, the terminal device can select the SUL carrier for the data transmission.

As another example, the target uplink carrier may be the uplink carrier indicated by the network device for transmitting the small data.

The first information may include the uplink carrier indicated by the network device for transmitting the small data. If the network device indicates to the terminal device the uplink carrier for transmitting the small data, the terminal device can transmit the small data on the uplink carrier indicated by the network device. That is, the target carrier can be the uplink carrier indicated by the network device.

The network device can indicate to the terminal device the uplink carrier for transmitting the small data using at least one of an RRC release message and a small data complete message.

For example, when the terminal device is released from the connected state to the idle state or the inactive state, the network device can indicate to the terminal device which of the SUL carrier and the NUL carrier is to be used for the next small data transmission, using an RRC release message. When the terminal device is released from the connected state to the idle state or the inactive state, the terminal device is likely to transmit the small data next time, thus the network device can use the RRC release message to indicate the uplink carrier for transmitting the small data. This is simple and easy to implement.

As another example, when the terminal device completes a small data transmission but has not yet entered the connected state, the network device can indicate to the terminal device which of the SUL carrier and the NUL carrier is to be used for a next small data transmission, using a small data complete message or an RRC release message.

When the network device indicates to the terminal device the uplink carrier for transmitting the small data, it may indicate the uplink carrier based on position information of the terminal device.

For example, for a static terminal device, the network device can indicate to the terminal device the uplink carrier to be used for the next small data transmission by referring to the uplink carrier previously indicated to the terminal device. The static terminal device may mean that a position of the terminal device has not changed significantly from a previous position.

The terminal device can report status information to the network device, and then the network device can determine whether the terminal device is static based on the status information reported by the terminal device. Alternatively, the network device can determine whether the terminal device is static by means of detection by itself.

In another example, the network device may indicate to the terminal device the carrier for transmitting the small data based on position information of other terminal devices and conditions of uplink carriers selected by the other terminal devices. In particular, the other terminal devices may be located in the same cell as the terminal device, and the other terminal devices select their respective target carriers based on the channel quality of the serving cell. If the distance between the position of a certain terminal device and the position of the terminal device is smaller than a predetermined value, and if the certain terminal device selects the SUL carrier, the network device can indicate to the terminal device to transmit the small data on the SUL carrier.

As another example, the target uplink carrier may be determined based on the size of the data to be transmitted. For example, when the size of the data to be transmitted is greater than or equal to a first threshold, the terminal device can select the SUL carrier as the target uplink carrier. When the size of the data to be transmitted is smaller than the first threshold, the terminal device can select the NUL carrier as the target uplink carrier.

As another example, the target uplink carrier may be one of the NUL carrier and the SUL carrier that supports the TBS greater than or equal to the size of the data to be transmitted.

The first information may include the TBS supported by the NUL carrier and the TBS supported by the SUL carrier, and the terminal device can select the target carrier based on the size of the data to be transmitted and the TBS supported by the NUL carrier and the TBS supported by the SUL carrier.

The TBS supported by the SUL carrier may include the largest TBS supported by the SUL carrier, and the TBS supported by the NUL carrier may include the largest TBS supported by the NUL carrier.

When the size of the data to be transmitted is not greater than the TBS supported by the SUL carrier, the target carrier may include the SUL carrier. When the size of the data to be transmitted is not greater than the TBS supported by the NUL carrier, the target carrier may include the NUL carrier.

The size of the data to be transmitted not being greater than the TBS supported by the SUL carrier may indicate that the size of the data to be transmitted is not greater than the maximum TBS supported by the SUL carrier. The size of the data to be transmitted not being greater than the TBS supported by the NUL carrier may indicate that the size of the data to be transmitted is not greater than the maximum TBS supported by the NUL carrier. Four cases will be described below.

Case 1: If the size of the data to be transmitted only meets a condition of the TBS supported by the SUL carrier, but does not meet a condition of the TBS supported by the NUL carrier, i.e., if the size of the data to be transmitted is not greater than the maximum TBS supported by the SUL carrier, but is greater than the maximum TB S supported by the NUL carrier, the terminal device can select the SUL carrier as the target carrier and transmit the small data on the SUL carrier.

Optionally, if the channel quality range corresponding to the SUL carrier is broadcasted in the system message, the terminal device may further compare a measurement result of the channel quality of the serving cell with the channel quality range corresponding to the SUL carrier, so as to determine the target carrier. If the channel quality of the serving cell is within the channel quality range corresponding to the SUL carrier, the terminal device can transmit the small data on the SUL carrier. If the channel quality of the serving cell is outside the channel quality range corresponding to the SUL carrier, the terminal device can transmit a connection establishment request message or connection resume request message carrying no small data to the network device.

The channel quality range corresponding to the SUL carrier can be reflected by a threshold value, with reference to the above description for details. When the threshold of the channel quality includes the first threshold value as an example, if the channel quality of the serving cell is lower than the first threshold value, the terminal device can transmit the small data on the SUL carrier, or if the channel quality in the serving cell is higher than or equal to the first threshold value, the terminal device can transmit a connection establishment request message or connection resume request message carrying no small data to the network device.

Of course, since the channel quality of the serving cell is higher than or equal to the first threshold value, it means that the channel quality of the current serving cell is relatively good, and the terminal device can also use the SUL carrier for transmitting the small data, and in this case, using the SUL carrier for transmitting the small data can guarantee the success rate of the data transmission.

Case 2: If the size of the data to be transmitted only meets the condition of the TBS supported by the NUL carrier, but does not meet the condition of the TBS supported by the SUL carrier, i.e., if the size of the data to be transmitted is not greater than the maximum TBS supported by the NUL carrier, but is larger than the maximum TBS supported by the SUL carrier, the terminal device can select the NUL carrier as the target carrier and transmit the small data on the NUL carrier.

Optionally, if the channel quality range corresponding to the NUL carrier is broadcasted in the system message, the terminal device may further compare a measurement result of the channel quality of the serving cell with the channel quality range corresponding to the NUL carrier, so as to determine the target carrier. If the channel quality of the serving cell is within the channel quality range corresponding to the NUL carrier, the terminal device can transmit the small data on the NUL carrier. If the channel quality of the serving cell is outside the channel quality range corresponding to the NUL carrier, the terminal device can transmit a connection establishment request message or connection resume request message carrying no small data to the network device.

The channel quality range corresponding to the SUL carrier can be reflected by a threshold value, with reference to the above description for details. When the threshold of the channel quality includes the first threshold value as an example, if the channel quality of the serving cell is higher than or equal to the first threshold value, the terminal device can transmit the small data on the NUL carrier, or if the channel quality in the serving cell is lower than the first threshold value, the terminal device can transmit a connection establishment request message or connection resume request message carrying no small data to the network device.

Case 3: If the size of the data to be transmitted meets the condition of the TBS supported by the SUL carrier and the condition of the TBS supported by the NUL carrier, i.e., if the size of the data to be transmitted is smaller than or equal to the maximum TBS supported by the SUL carrier and smaller than or equal to the maximum TBS supported by the NUL carrier, the terminal device can select one of the SUL carrier and the NUL carrier for transmitting the small data.

The embodiment of the present disclosure is not limited to any specific scheme in which the terminal device selects the uplink carrier. For example, the terminal device may preferentially select the NUL carrier as long as the NUL carrier is available. In another example, the terminal device may preferentially select the SUL carrier as long as the SUL carrier is available. As another example, the terminal device may randomly select a carrier based on the load balancing factor of the SUL carrier and the load balancing factor of the NUL carrier as described below.

Optionally, if the channel quality range corresponding to the SUL carrier and the channel quality range corresponding to the NUL carrier are broadcasted in the system message, the terminal device can further compare a channel quality measurement result of the serving cell with a channel quality range corresponding to the NUL carrier and a channel quality range corresponding to the SUL carrier, so to determine the target carrier.

When the channel quality range is reflected by the first threshold value as an example, if the size of the data to be transmitted is greater than or equal to the first threshold value, the terminal device can select the NUL carrier as the target carrier, and the terminal device can transmit the small data on the NUL carrier. If the size of the data to be transmitted is smaller than the first threshold value, the terminal device can select the SUL carrier as the target carrier, and the terminal device can transmit the small data on the SUL carrier.

Case 4: If the size of the data to be transmitted meets neither the condition of the TBS supported by the SUL carrier nor the condition of the TBS supported by the NUL carrier, i.e., if the size of the data to be transmitted is greater than the maximum TBS supported by the SUL carrier and also greater than the maximum TBS supported by the NUL carrier, the terminal device can transmit a connection establishment request message or connection resume request message carrying no small data to the network device.

The terminal device transmitting the connection establishment request message or connection resume request message carrying no small data to the network device may include the terminal device reporting that the NAS layer small data cannot be transmitted, thus the NAS layer can choose whether to trigger the terminal device to transmit the connection establishment request message or connection resume request message carrying no small data to the network device subsequently.

As another example, the target uplink carrier may be determined based on the load balancing factor of the SUL carrier and the load balancing factor of the NUL carrier.

The first information may include the load balancing factor of the SUL carrier and the load balancing factor of the NUL carrier, and the terminal device may select the target cell based on the load balancing factor of the SUL carrier and the load balancing factor of the NUL carrier. For example, assuming that the load balancing factor of the SUL carrier and the load balancing factor of the NUL carrier are 0.4 and 0.6, respectively, the terminal device can select the SUL carrier with a probability of 0.4 and the NUL carrier with a probability of 0.6. In particular, the terminal device can generate a random number between 1 and 10, and if the random number is between 1 and 4, the terminal device can select the SUL carrier for transmitting the small data, or if the random number is between 5 and 10, the terminal device can select the NUL carrier for transmitting the small data.

Optionally, the terminal device may first select at least one candidate carrier in the manner as described above. When the at least one candidate carrier includes the NUL carrier and the SUL carrier, the terminal device may further determine the target carrier based on the load balance factor of the SUL carrier and the load balancing factor of the NUL carrier.

For example, the terminal device can select the target carrier based on the TBS supported by the SUL carrier and the TBS supported by the NUL carrier, and if the size of the data to be transmitted meets both the condition to be transmitted on the SUL carrier and the condition to be transmitted on the NUL carrier, the terminal device can further select the target carrier based on the load balance factor of the SUL carrier and the load balancing factor of the NUL carrier.

The solution of selecting the target carrier based on the load balancing factors can reasonably allocate the selection by the terminal device on the two carriers depending on the load conditions of the uplink carriers, and can improve the system resource utilization. Especially for terminal devices located at the same geographical position, or in a scenario where it is difficult to distinguish between terminal devices based on the channel quality of the serving cell, the terminal devices can reasonably allocate their selection on two carriers based on the load conditions of the uplink carriers, thereby avoiding the problem that the terminal devices at the same geographical position select the same uplink carrier, causing the uplink carrier to be overloaded, while the other uplink carrier cannot be fully utilized.

In an embodiment of the present disclosure, the target carrier may refer to a target uplink carrier.

In the embodiment of the present disclosure, the terminal device may refer to an MTC terminal.

In the above description, when the channel quality of the serving cell is equal to the first threshold value, the terminal device can select the NUL carrier as the target carrier. This is only an example. When the channel quality of the serving cell is equal to the first threshold value, the terminal device may alternatively use the SUL carrier as the target carrier. That is, when the channel quality of the serving cell is higher than the first threshold value, the terminal device can use the NUL carrier as the target carrier, and when the channel quality of the serving cell is lower than or equal to the first threshold value, the terminal device can use the SUL carrier as the target carrier. The same also applies to the second threshold and the third threshold, and details thereof will be omitted here.

In the method described above, different channel quality ranges are provided for the SUL carrier and the NUL carrier, respectively. This is only an example. The channel quality range corresponding to the SUL carrier may overlap the channel quality range corresponding to the NUL carrier. For example, the channel quality range corresponding to the SUL carrier may include the channel quality range corresponding to the NUL carrier. For the first threshold value as an example, when the channel quality of the serving cell is higher than the first threshold value, the terminal device can use the NUL carrier or the SUL carrier for transmitting the small data.

The selection of the target uplink carrier can be determined according to any of the methods described above, or can be determined according to any combination of the methods described above. The embodiment of the present disclosure is not limited to any of these examples.

The method of the embodiment of the present disclosure can be applied in selection of an uplink carrier for other data transmission processes, in addition to selection of the uplink carrier for small data transmission.

The method for transmitting small data according to the embodiment of the present disclosure has been described in detail above. The apparatuses according to the embodiments of the present disclosure will be described below with reference to FIG. 7 to FIG. 11. The technical features described in the method embodiments are applicable to the following apparatus embodiments.

Figure 7:
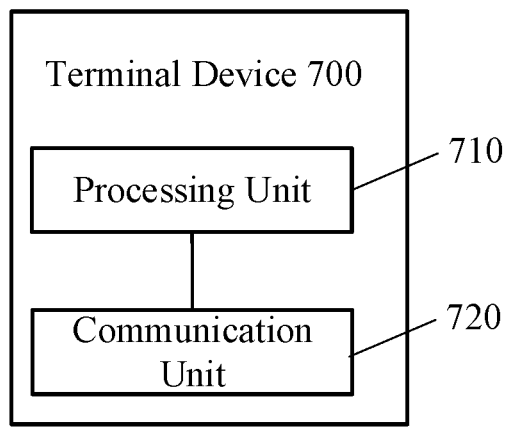
FIG. 7 is a schematic block diagram of a terminal device according to an embodiment of the present disclosure.

FIG. 7 is a schematic block diagram of a terminal device according to an embodiment of the present disclosure. The terminal device may be any of the terminal devices described above. The terminal device 700 in FIG. 7 includes a processing unit 710 and a communication unit 720.

The processing unit 710 is configured to determine a target uplink carrier from a Supplementary Uplink (SUL) carrier and a Normal Uplink (NUL) carrier based on first information. The first information includes at least one of: channel quality of a serving cell, a size of data to be transmitted, a Transport Block Size (TBS) supported by the SUL carrier and a TBS supported by the NUL carrier, a load balancing factor of the SUL carrier and a load balancing factor of the NUL carrier, and an uplink carrier indicated by a network device for transmitting the small data.

The communication unit 720 is configured to transmit the small data on the target uplink carrier.

Optionally, the target uplink carrier may be one of the NUL carrier and the SUL carrier that meets at least one of the following conditions: a corresponding channel quality range including the channel quality of the serving cell, and the supported TBS being greater than or equal to the size of the data to be transmitted, and the uplink carrier indicated by the network device for transmitting the small data.

Optionally, the target uplink carrier may be the NUL carrier when the channel quality of the serving cell is higher than or equal to a first threshold value, or the target uplink carrier may be the SUL carrier when the channel quality of the cell is lower than the first threshold value.

Optionally, the target uplink carrier may be the NUL carrier when the channel quality of the serving cell is higher than or equal to a first threshold value, or the target uplink carrier may be the SUL carrier when the channel quality of the serving cell is lower than the first threshold value and higher than or equal to a second threshold value that is smaller than the first threshold value.

Optionally, the target uplink carrier may be the NUL carrier when the channel quality of the serving cell is higher than or equal to a first threshold value, or the target uplink carrier may be the SUL carrier when the channel quality of the cell is lower than a third threshold value and higher than or equal to a second threshold value. The channel quality of the serving cell being lower than the first threshold value and higher than or equal to the third threshold value may trigger the terminal device to select the NUL carrier for transmitting a connection establishment request message or connection resume request message carrying no small data to the network device. The third threshold value is greater than the second threshold value and smaller than the first threshold value.

Optionally, the channel quality of the serving cell being lower than the second threshold value may trigger the terminal device to select the SUL carrier for transmitting the connection establishment request message or connection resume request message carrying no small data to the network device.

Optionally, the channel quality of the serving cell may be represented by at least one of: Reference Signal Received Power (RSRP), Reference Signal Received Quality (RSRQ), Received Signal Strength Indication (RSSI), and Signal to Interference plus Noise Ratio (SINR).

Optionally, the uplink carrier for transmitting the small data is indicated by the network device to the terminal device using at least one of a Radio Resource Control (RRC) release message and a small data transmission complete message.

Optionally, the processing unit 710 may be configured to: determine at least one candidate uplink carrier based on at least one of the channel quality of the serving cell, the TBS supported by the SUL carrier, and the TBS supported by the NUL carrier; and select, when the at least one candidate uplink carrier includes the NUL carrier and the SUL carrier, one of the SUL carrier and the NUL carrier as the target uplink carrier based on the load balancing factor of the SUL carrier and the load balancing factor of the NUL carrier.

Optionally, the target uplink carrier may include the SUL carrier when the size of data to be transmitted is not greater than the TBS supported by the SUL carrier, or the target uplink carrier includes the NUL carrier when the size of the data to be transmitted is not greater than the TBS supported by the NUL carrier.

Optionally, the terminal device may be in an idle state or an inactive state.

Optionally, the processing unit 710 may be configured to transmit the small data on the target uplink carrier in a first scheme. The first scheme may include at least one of: the third message in a four-step random access procedure, the first message in a two-step random access procedure, a pre-configured uplink resource.

Figure 8:
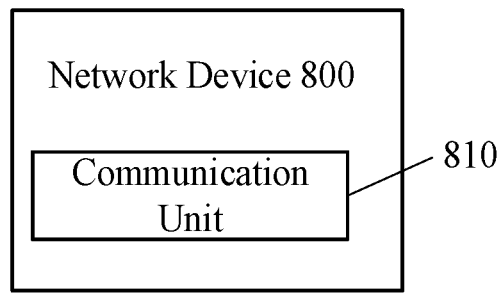
FIG. 8 is a schematic block diagram of a network device according to an embodiment of the present disclosure.

FIG. 8 is a schematic block diagram of a network device according to an embodiment of the present disclosure. The network device may be any of the network devices described above. The network device may be, for example, the base station described above. The network device 800 in FIG. 8 includes a communication unit 810.

The communication unit 810 is configured to transmit indication information to a terminal device, the indication information including at least one of: at least one threshold of a channel quality of a serving cell, a Transport Block Size (TBS) supported by a Supplementary Uplink (SUL) carrier and a TBS supported by a Normal Uplink (NUL) carrier, a load balancing factor of the SUL carrier and a load balancing factor of the NUL carrier, and an uplink carrier indicated for transmitting the small data, the indication information being used for the terminal device to select a target uplink carrier from the SUL carrier and the NUL carrier for transmitting the small data.

Optionally, the at least one threshold of the channel quality of the serving cell may include a first threshold value. The channel quality of the serving cell being higher than or equal to the first threshold value may trigger the terminal device to select the NUL carrier as the target uplink carrier, and the channel quality of the serving cell being lower than the first threshold value may trigger the terminal device to select the SUL carrier as the target uplink carrier.

Optionally, the at least one threshold of the channel quality of the serving cell may include a first threshold value and a second threshold value. The channel quality of the serving cell being higher than or equal to the first threshold value may trigger the terminal device to select the NUL carrier as the target uplink carrier, and the channel quality of the serving cell being lower than the first threshold value and higher than or equal to the second threshold value may trigger the terminal device to select the SUL carrier as the target uplink carrier. The second threshold value may be smaller than the first threshold value.

Optionally, the at least one threshold of the channel quality of the serving cell may include a first threshold value, a second threshold value, and a third threshold value. The channel quality of the serving cell being higher than or equal to the first threshold value may trigger the terminal device to select the NUL carrier as the target uplink carrier, the channel quality of the serving cell being lower than the third threshold value and higher than or equal to the second threshold value may trigger the terminal device to select the SUL carrier as the target uplink carrier, and the channel quality of the serving cell being lower than the first threshold value and higher than or equal to the third threshold value may trigger the terminal device to select the NUL carrier for transmitting a connection establishment request message or a connection resume request message carrying no small data to the network device. The third threshold value may be greater than the second threshold value and smaller than the first threshold value.

Optionally, the channel quality of the serving cell being lower than the second threshold value may trigger the terminal device to select the SUL carrier for transmitting the connection establishment request message or connection resume request message carrying no small data to the network device.

Optionally, the channel quality of the serving cell may be represented by at least one of: Reference Signal Received Power (RSRP), Reference Signal Received Quality (RSRQ), Received Signal Strength Indication (RSSI), and Signal to Interference plus Noise Ratio (SINR).

Optionally, the uplink carrier for transmitting the small data may be indicated by the network device to the terminal device using at least one of a Radio Resource Control (RRC) release message and a small data transmission complete message.

Optionally, the TBS supported by the SUL carrier may indicate that the terminal device is to select the SUL carrier as the target uplink carrier when a size of data to be transmitted is not greater than the TBS supported by the SUL carrier, and the TBS supported by the NUL carrier may indicate that the terminal device is to select the NUL carrier as the target uplink carrier when a size of data to be transmitted is not greater than the TBS supported by the NUL carrier.

Optionally, the terminal device may be in an idle state or an inactive state.

Figure 9:
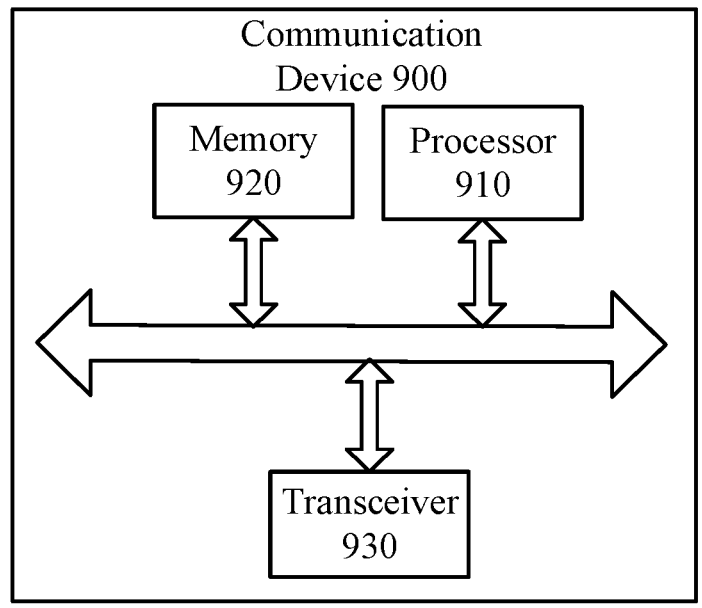
FIG. 9 is a schematic diagram illustrating a structure of a communication device according to an embodiment of the present disclosure.

FIG. 9 is a schematic diagram illustrating a structure of a communication device 900 according to an embodiment of the present disclosure. The communication device 900 illustrated in FIG. 9 includes a processor 910, and the processor 910 may invoke and execute a computer program from a memory to perform the method according to any one of the embodiments of the present disclosure.

Optionally, as illustrated in FIG. 9, the communication device 900 may further include a memory 920. The processor 910 can invoke and execute a computer program from the memory 920 to perform the method according to any of the embodiments of the present disclosure.

The memory 920 may be a separate device independent of the processor 910, or may be integrated in the processor 910.

Optionally, as illustrated in FIG. 9, the communication device 900 may further include a transceiver 930. The processor 910 can control the transceiver 930 to communicate with other devices, and in particular to transmit information or data to other devices or receive information or data transmitted by other devices.

Here, the transceiver 930 may include a transmitter and a receiver. The transceiver 930 may further include one or more antennas.

Optionally, the communication device 900 may be the network device in the embodiment of the present disclosure, and the communication device 900 can perform corresponding procedures implemented by the network device in the method according to any of the embodiments of the present disclosure. Details thereof will be omitted here for simplicity.

Optionally, the communication device 900 may be the mobile terminal/terminal device in the embodiment of the present disclosure, and the communication device 900 can perform corresponding procedures implemented by the mobile terminal/terminal device in the method according to any of the embodiments of the present disclosure. In particular, the communication device 900 can perform corresponding procedures implemented by the first terminal device and/or the second terminal device in the method according to any of the embodiments of the present disclosure. Details thereof will be omitted here for simplicity.

Figure 10:
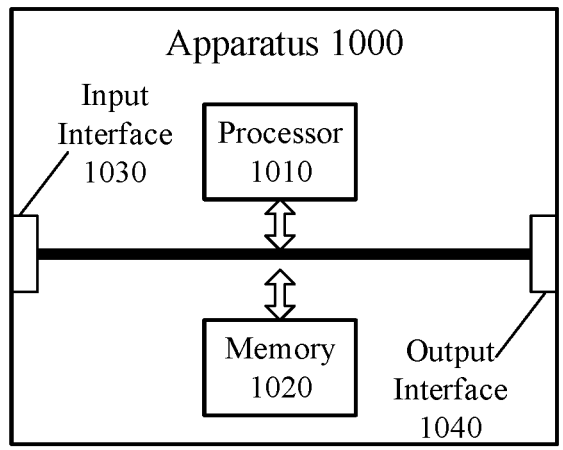
FIG. 10 is a schematic diagram illustrating a structure of a communication device according to an embodiment of the present disclosure.

FIG. 10 is a schematic diagram illustrating a structure of an apparatus 1000 according to an embodiment of the present disclosure. The apparatus 1000 illustrated in FIG. 10 includes a processor 1010, and the processor 1010 can invoke and run a computer program from a memory to implement the method in the embodiment of the present disclosure.

Optionally, as illustrated in FIG. 10, the apparatus 1000 may further include a memory 1020. The processor 1010 can invoke and run a computer program from the memory 1020 to implement the method in the embodiment of the present disclosure.

The memory 1020 may be a separate device independent from the processor 1010, or may be integrated in the processor 1010.

Optionally, the apparatus 1000 may further include an input interface 1030. The processor 1010 can control the input interface 1030 to communicate with other devices or apparatuses, and in particular, obtain information or data transmitted by other devices or apparatuses.

Optionally, the apparatus 1000 may further include an output interface 1040. The processor 1010 can control the output interface 1040 to communicate with other devices or apparatuses, and in particular, output information or data to other devices or apparatuses.

Optionally, the apparatus can be applied to the network device in the embodiment of the present disclosure, and the apparatus can implement the corresponding processes implemented by the network device in the various methods of the embodiments of the present disclosure. For the sake of brevity, details thereof will be omitted here.

Optionally, the apparatus can be applied to the mobile terminal/terminal device in the embodiment of the present disclosure, and the apparatus can implement the corresponding process implemented by the mobile terminal/terminal device in each method of the embodiment of the present disclosure. For the sake of brevity, details thereof will be omitted here.

It can be appreciated that the apparatus in the embodiment of the present disclosure may be a chip, and the chip may also be referred to as a system-level chip, a system-chip, a chip system, or a system-on-chip.

Figure 11:
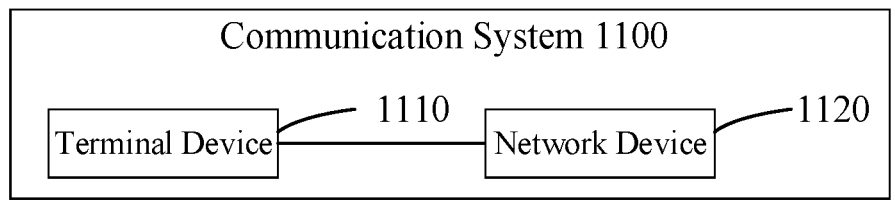
FIG. 11 is a schematic block diagram of a communication system according to an embodiment of the present disclosure.

FIG. 11 is a schematic block diagram of a communication system 1100 according to an embodiment of the present disclosure. As illustrated in FIG. 11, the communication system 1100 includes a terminal device 1110 and a network device 1120.

Here, the terminal device 1110 can be configured to implement the corresponding functions implemented by the terminal device in the above method, and the network device 1120 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and include instructions to cause a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A method for transmitting small data, comprising:
determining, by a terminal device, a target uplink carrier from a Supplementary Uplink (SUL) carrier and a Normal Uplink (NUL) carrier based on first information, the first information comprising at least one of: channel quality of a serving cell, a size of data to be transmitted, a Transport Block Size (TBS) supported by the SUL carrier and a TBS supported by the NUL carrier, a load balancing factor of the SUL carrier and a load balancing factor of the NUL carrier, and an uplink carrier indicated by a network device for transmitting the small data; and transmitting, by the terminal device, the small data on the target uplink carrier,
wherein the target uplink carrier is the NUL carrier when the channel quality of the serving cell is higher than or equal to a first threshold value, or the target uplink carrier is the SUL carrier when the channel quality of the serving cell is lower than the first threshold value and higher than or equal to a second threshold value that is smaller than the first threshold value; or
the target uplink carrier is the NUL carrier when the channel quality of the serving cell is higher than or equal to a first threshold value, or the target uplink carrier is the SUL carrier when the channel quality of the cell is lower than a third threshold value and higher than or equal to a second threshold value, wherein the channel quality of the serving cell being lower than the first threshold value and higher than or equal to the third threshold value triggers the terminal device to select the NUL carrier for transmitting a connection establishment request message or connection resume request message carrying no small data to the network device, wherein the third threshold value is greater than the second threshold value and smaller than the first threshold value.

2. The method according to claim 1, wherein the target uplink carrier is one of the NUL carrier and the SUL carrier that meets at least one of the following conditions: a corresponding channel quality range comprising the channel quality of the serving cell, and the supported TBS being greater than or equal to the size of the data to be transmitted, and the uplink carrier indicated by the network device for transmitting the small data.

3. The method according to claim 1, wherein the channel quality of the serving cell being lower than the second threshold value triggers the terminal device to select the SUL carrier for transmitting a connection establishment request message or connection resume request message carrying no small data to the network device.

4. The method according to claim 1, wherein the channel quality of the serving cell is represented by at least one of: Reference Signal Received Power (RSRP), Reference Signal Received Quality (RSRQ), Received Signal Strength Indication (RSSI), and Signal to Interference plus Noise Ratio (SINR).

5. The method according to claim 1, wherein the uplink carrier for transmitting the small data is indicated by the network device to the terminal device using at least one of a Radio Resource Control (RRC) release message and a small data transmission complete message.

6. The method according to claim 1, wherein the terminal device is in an idle state or an inactive state.

7. The method according to claim 1, wherein said transmitting, by the terminal device, the small data on the target uplink carrier comprises:
transmitting, by the terminal device, the small data on the target uplink carrier in a first scheme, the first scheme comprising at least one of: the third message in a four-step random access procedure, the first message in a two-step random access procedure, a pre-configured uplink resource.

8. A method for transmitting small data, comprising:
transmitting, by a network device, indication information to a terminal device, the indication information comprising at least one of: at least one threshold of a channel quality of a serving cell, a Transport Block Size (TBS) supported by a Supplementary Uplink (SUL) carrier and a TBS supported by a Normal Uplink (NUL) carrier, a load balancing factor of the SUL carrier and a load balancing factor of the NUL carrier, and an uplink carrier indicated for transmitting the small data, the indication information being used for the terminal device to select a target uplink carrier from the SUL carrier and the NUL carrier for transmitting the small data,
wherein the at least one threshold of the channel quality of the serving cell comprises a first threshold value and a second threshold value, and the channel quality of the serving cell being higher than or equal to the first threshold value triggers the terminal device to select the NUL carrier as the target uplink carrier, the channel quality of the serving cell being lower than the first threshold value and higher than or equal to the second threshold value triggers the terminal device to select the SUL carrier as the target uplink carrier, the second threshold value being smaller than the first threshold value; or
the at least one threshold of the channel quality of the serving cell comprises a first threshold value, a second threshold value, and a third threshold value, the channel quality of the serving cell being higher than or equal to the first threshold value triggers the terminal device to select the NUL carrier as the target uplink carrier, the channel quality of the serving cell being lower than the third threshold value and higher than or equal to the second threshold value triggers the terminal device to select the SUL carrier as the target uplink carrier; the channel quality of the serving cell being lower than the first threshold value and higher than or equal to the third threshold value triggers the terminal device to select the NUL carrier for transmitting a connection establishment request message or connection resume request message carrying no small data to the network device, wherein the third threshold value is greater than the second threshold value and smaller than the first threshold value.

9. The method according to claim 8, wherein the channel quality of the serving cell being lower than the second threshold value triggers the terminal device to select the SUL carrier for transmitting a connection establishment request message or connection resume request message carrying no small data to the network device.

10. A terminal device, comprising a processor and a memory, wherein the memory is configured to store a computer program, and the processor is configured to invoke and execute the computer program stored in the memory to perform the method according to claim 1.

11. A network device, comprising a processor and a memory, wherein the memory is configured to store a computer program, and the processor is configured to invoke and execute the computer program stored in the memory to:
transmit indication information to a terminal device, the indication information comprising at least one of: at least one threshold of a channel quality of a serving cell, a Transport Block Size (TBS) supported by a Supplementary Uplink (SUL) carrier and a TBS supported by a Normal Uplink (NUL) carrier, a load balancing factor of the SUL carrier and a load balancing factor of the NUL carrier, and an uplink carrier indicated for transmitting the small data, the indication information being used for the terminal device to select a target uplink carrier from the SUL carrier and the NUL carrier for transmitting the small data,
wherein the at least one threshold of the channel quality of the serving cell comprises a first threshold value and a second threshold value, and the channel quality of the serving cell being higher than or equal to the first threshold value triggers the terminal device to select the NUL carrier as the target uplink carrier, the channel quality of the serving cell being lower than the first threshold value and higher than or equal to the second threshold value triggers the terminal device to select the SUL carrier as the target uplink carrier, the second threshold value being smaller than the first threshold value; or the at least one threshold of the channel quality of the serving cell comprises a first threshold value, a second threshold value, and a third threshold value, the channel quality of the serving cell being higher than or equal to the first threshold value triggers the terminal device to select the NUL carrier as the target uplink carrier, the channel quality of the serving cell being lower than the third threshold value and higher than or equal to the second threshold value triggers the terminal device to select the SUL carrier as the target uplink carrier; the channel quality of the serving cell being lower than the first threshold value and higher than or equal to the third threshold value triggers the terminal device to select the NUL carrier for transmitting a connection establishment request message or connection resume request message carrying no small data to the network device, wherein the third threshold value is greater than the second threshold value and smaller than the first threshold value.

12. The network device according to claim 11, wherein the channel quality of the serving cell is represented by at least one of: Reference Signal Received Power (RSRP), Reference Signal Received Quality (RSRQ), Received Signal Strength Indication (RSSI), and Signal to Interference plus Noise Ratio (SINR).

* * * * *